(12) United States Patent
Strang

(10) Patent No.: US 10,455,977 B2
(45) Date of Patent: Oct. 29, 2019

(54) FOOD PROCESSOR AND METHOD FOR OPERATING A FOOD PROCESSOR

(71) Applicant: Vorwerk & Co. Interholding GmbH, Wuppertal (DE)

(72) Inventor: Benjamin Strang, Solingen (DE)

(73) Assignee: Vorwerk & Co. Interholding GmbH, Wuppertal (DE)

( * ) Notice: Subject to any disclaimer, the term of this patent is extended or adjusted under 35 U.S.C. 154(b) by 0 days.

(21) Appl. No.: 16/188,607

(22) Filed: Nov. 13, 2018

(65) Prior Publication Data

US 2019/0075965 A1    Mar. 14, 2019

Related U.S. Application Data

(62) Division of application No. 15/216,774, filed on Jul. 22, 2016, now Pat. No. 10,231,574.

(30) Foreign Application Priority Data

Jul. 24, 2015   (EP) ..................................... 15178212

(51) Int. Cl.
| | |
|---|---|
| *A47J 36/32* | (2006.01) |
| *A47J 43/046* | (2006.01) |
| *A47J 43/07* | (2006.01) |
| *A47J 44/00* | (2006.01) |
| *A47J 43/04* | (2006.01) |
| *G06F 1/16* | (2006.01) |

(Continued)

(52) U.S. Cl.
CPC ............... *A47J 36/32* (2013.01); *A47J 43/04* (2013.01); *A47J 43/046* (2013.01); *A47J 43/07* (2013.01); *A47J 44/00* (2013.01); *G06F 1/163* (2013.01); *G06F 1/1686* (2013.01); *G06F 3/011* (2013.01); *G06F 3/0304* (2013.01); *A47J 27/004* (2013.01); *G06F 3/03* (2013.01)

(58) Field of Classification Search
CPC ................................ A47J 36/24; A47J 43/046
USPC ......................................... 366/142, 205, 206
See application file for complete search history.

(56) References Cited

U.S. PATENT DOCUMENTS

| | | | |
|---|---|---|---|
| 8,963,861 B2 * | 2/2015 | Lee ....................... | A47J 43/046 345/173 |
| 2013/0044042 A1 | 2/2013 | Olsson et al. | |

(Continued)

FOREIGN PATENT DOCUMENTS

| | | |
|---|---|---|
| DE | 10 2013 006 576 A1 | 10/2014 |
| WO | 03/075727 A1 | 9/2003 |

*Primary Examiner* — David L Sorkin
(74) *Attorney, Agent, or Firm* — Collard & Roe, P.C.

(57) ABSTRACT

A method for operating an electric motor-driven food processor for preparing a preparation item, wherein is prepared in one or more sequential preparation steps. A user of the food processor receives information from the food processor about an operating parameter for the food processor and/or a preparation parameter for the preparation item and/or transmits said information to the food processor. In order to make using the food processor especially comfortable for a user, the information is projected into the visual field of the user by a wearable image generating device configured separately from the food processor, in particular an eyeglass-type construction worn in front of an eye while the user is looking at the food processor in a defined angular range, wherein the information is superimposed onto the visual field.

5 Claims, 3 Drawing Sheets

(51) Int. Cl.
  *G06F 3/01* (2006.01)
  *G06F 3/03* (2006.01)
  *A47J 27/00* (2006.01)

(56) References Cited

U.S. PATENT DOCUMENTS

| | | | |
|---|---|---|---|
| 2015/0023126 A1* | 1/2015 | Brown | A47J 43/07 366/142 |
| 2015/0290795 A1 | 10/2015 | Oleynik | |
| 2015/0305564 A1* | 10/2015 | Jimenez | A47J 43/046 366/141 |
| 2016/0058245 A1* | 3/2016 | Smith | A47J 31/401 366/150.1 |

* cited by examiner

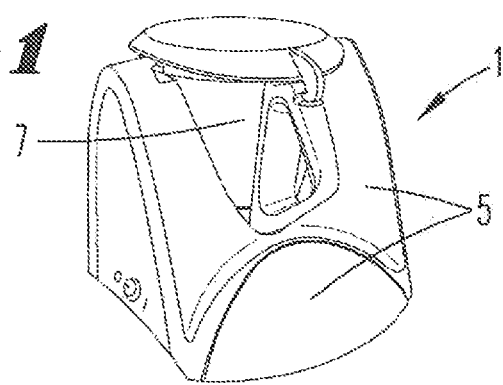
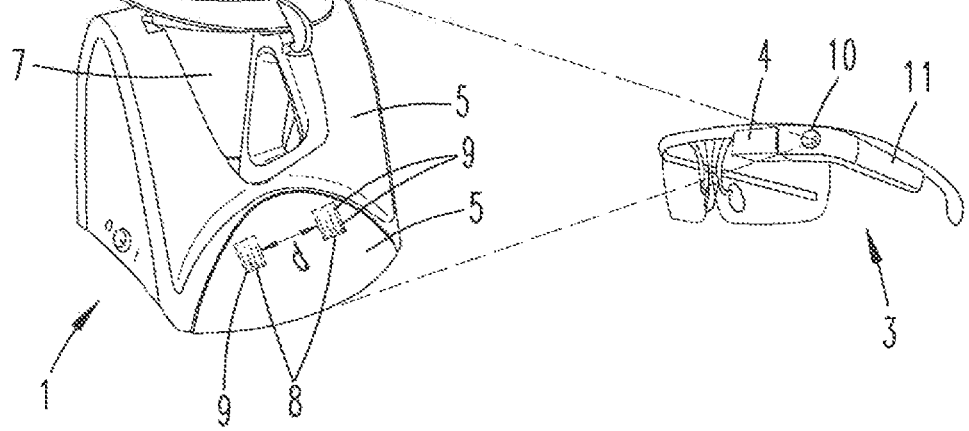
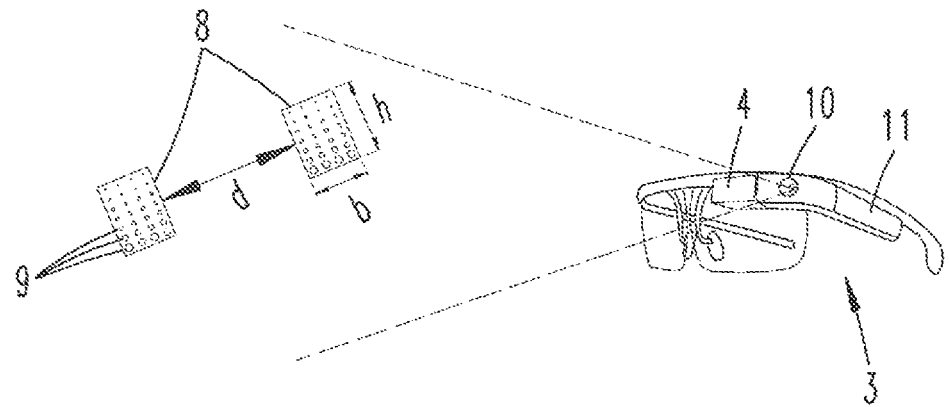

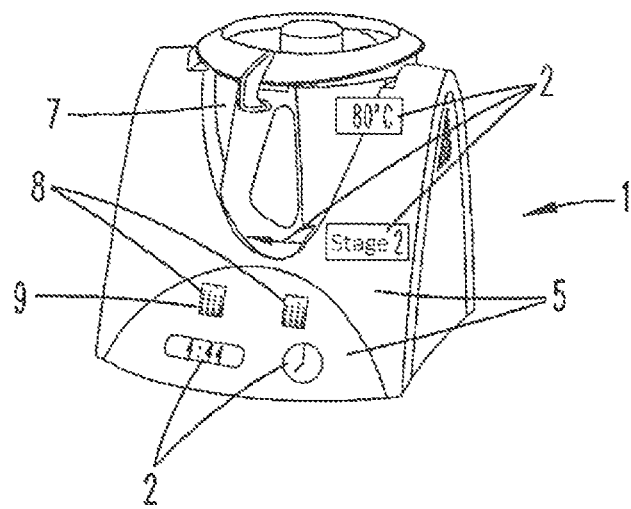
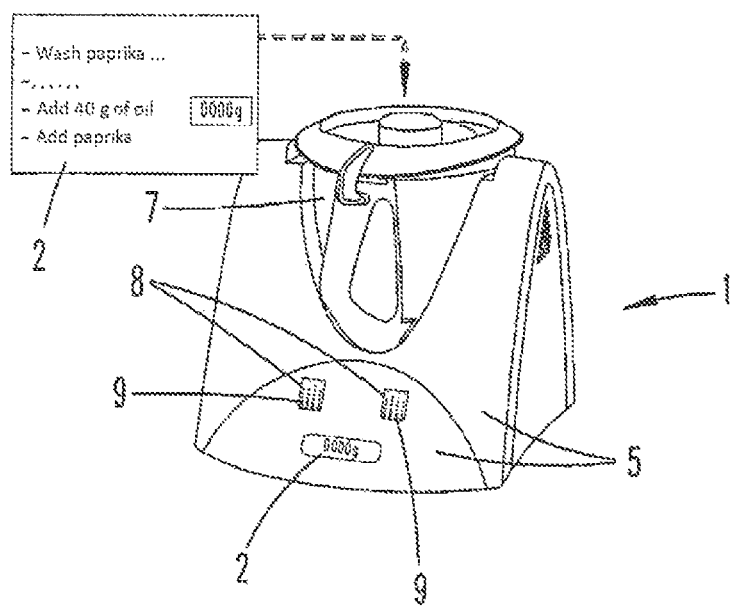

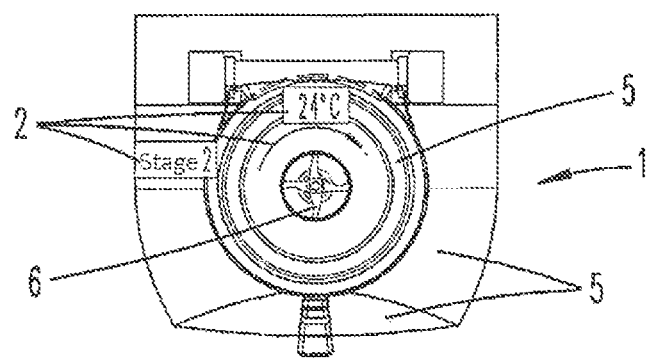
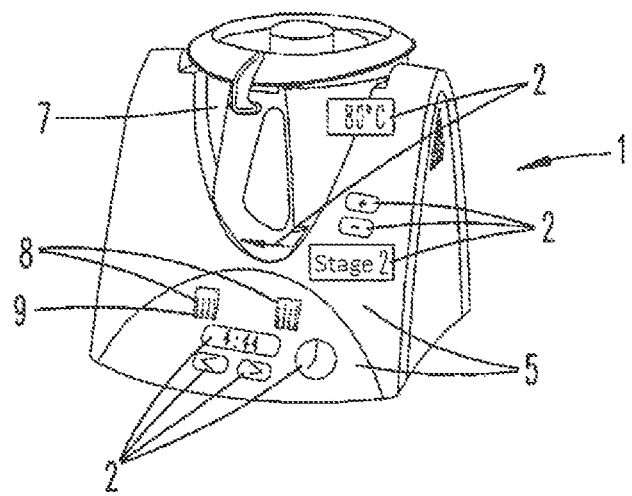

FOOD PROCESSOR AND METHOD FOR OPERATING A FOOD PROCESSOR

CROSS-REFERENCE TO RELATED APPLICATIONS

This application is a divisional of U.S. patent application Ser. No. 15/216,774, filed on Jul. 22, 2016, which claims priority from European Patent Application No. 15178212.5, filed on Jul. 24, 2015, the disclosures of both of which are herein incorporated by reference. A certified copy of priority European Patent Application No. 15178212.5 is contained in parent U.S. application Ser. No. 15/216,774.

BACKGROUND OF THE INVENTION

1. Field of the Invention

The invention initially relates to a method for operating an electric motor-driven food processor for preparing a preparation item, wherein the preparation item is prepared in one or more sequential preparation steps, wherein a user of the food processor receives information from the food processor about an operating parameter for the food processor and/or a preparation parameter for the preparation item and/or transmits said information to the food processor.

In addition, the invention relates to an electrically driven food processor with a preparation vessel, a mixer and/or heating element allocated to the preparation vessel and a communication device for communicating with a user of the food processor, in particular for transmitting information about an operating parameter for the food processor and/or a preparation parameter for a preparation item.

The invention also relates to a system comprised of a food processor and a wearable image generating device configured separately from the food processor.

2. The Prior Art

Food processors of the kind in question are known. As a rule, the latter exhibit a preparation vessel that can be removed from the food processor, and incorporates a mixer. The mixer is driven by an electric motor on the food processor side, to which end a coupling is provided at the interface between the preparation vessel and food processor-side receptacle. As a rule, a speed controller is provided for regulating the electric motor driving the mixer, and arranged in a separate display area of the food processor, potentially together with additional control and display elements. It is further known to heat the preparation vessel with a heating device. For example, the vessel floor comprises a controllable heating element. Such a food processor is known from WO 2003/075727 A1, for example.

DE 10 2013 006576 A1 describes a cooling and/or freezing device, in which a display device is provided, situated directly on the cooling and/or freezing device. It can be covered by a closure element in one operating state, and visible to a user even with the closure element closed in another operating state.

SUMMARY OF THE INVENTION

Proceeding from the aforementioned prior art, the object of the invention is to make using the food processor even more comfortable for a user. In particular, alternatives to the known control and display elements are to be created.

In order to achieve the aforementioned object, the invention initially proposes a method for operating an electric motor-driven food processor, in which information about one operating parameter for the food processor and/or one preparation parameter for the preparation item is projected into the visual field of the user by means of a wearable image generating device configured separately from the food processor, in particular an eyeglass-type construction worn in front of an eye.

Instead of a display integrated into the housing surface, the image generating device is now used to project information about operating parameters or preparation parameters into the viewing field of the user, so that the information is displayed directly in the visual field of the user, where the food processor is also located, giving the user the impression that the information appears on a partial area, in particular a display, of the food processor in the usual manner. In addition, it is also possible to project the information into the visual field of the user in such a way as to give the user the impression that the information is in the vicinity of the food processor, or in the environment of its components, such as a pot and mixing blade. As opposed to prior art, however, it is not necessary for the food processor itself to exhibit an active display device, for example the aforementioned display. The image generating device is advantageously worn by the user in the visual field of his or her eye or eyes, so that the information coming from the image generating device is projected directly into the visual field of the user directed at the food processor. In addition, it is also possible to project information into the visual field of the user when the food processor is not in the visual field of the user. One example for information that is superimposed without the food processor being in the visual field of the customer involves the time remaining for completion of the cooking process, or preparation information for the next recipe phase.

It is here especially advantageous that the image generating device be situated in front of the eye of the user like a kind of eyeglass frame, or secured to such an eyeglass frame. In terms of the invention, use can be made of an image generating device according to US 2013/0044042 A1, for example. The wearable image generating device is based on the principle of so-called "augmented reality" (augmented reality), wherein a second image that is superimposed onto a real image appears in the visual field of the user. For example, this second image generated by the image generating device can contain additional virtual information going beyond the real information within the visual field of the user. As a result, the amount of real information for the user present in the visual field is enhanced by additional, virtual information, providing the user with a wider range of information while using the food processor for preparing a preparation item.

In addition, the invention eliminates the need to provide a conventional display on the housing surface of the food processor, or embed a display in the housing surface. This not least also reduces the number of gaps present on the housing surface, in which dirt can gather. As a result, the user can clean the housing surface especially quickly and easily.

It is proposed that the image generating device project the information by means of a light source onto a projection surface of the food processor, onto a transparent surface worn in front of the eye, and hence lying in the visual field, and/or into an eye of the user, in particular locally allocated to a partial area of the food processor in the visual field of the user, which is allocated in terms of type to the operating parameter for the food processor and/or to the preparation parameter for the preparation item. In order to project the information into the visual field of the user, the image generating device exhibits a light source for emitting light representing the information onto preferably one or more optical elements, for example a deflection prism. In addition, the image generating device can optionally also exhibit a camera, in order to record images of the environment or visual field, so that both the environment/visual field and the information additionally projected into the visual field can be displayed to the user virtually instead of being perceived directly. The information can here be projected either into the visual field of the user, for example onto a partial area of the food processor, or directly into the eye of the user, giving the latter the impression that the information is actually being displayed on the housing of the food processor. The image is here projected directly onto the retina of the eye, wherein the user has the impression that the information is actually in front of his or her eye, for example. The information is advantageously always projected in such a way that the information appears on or directly next to such a partial area of the food processor that is linked with the corresponding operating parameter for the food processor or preparation parameter for the preparation item. For example, the operating parameter for the food processor can be the temperature of a heating device allocated to the preparation vessel. In this case, the operating parameter, i.e., the temperature of the heating device, is directly imaged on or next to the preparation vessel. The same also applies to preparation parameters for the preparation item, for example a temperature of the preparation item contained in the preparation vessel. The projection surface of the food processor is advantageously a partial area of the housing, in which a display of the housing is usually accommodated. Alternatively or additionally, the food processor can also exhibit projection surfaces in other partial areas of the housing and/or on the preparation vessel, a steam cooking attachment for the preparation vessel or the like. This makes operating the food processor especially intuitive. The information is no longer displayed on the partial area of the machine housing usually provided for a display, but rather advantageously in direct proximity to the respective component of the food processor connected to the information in terms of content, e.g., a preparation vessel for displaying the temperature of the heating device. With the image generating device and/or food processor in a deactivated state, the housing of the food processor is most extensively to be perceived as a closed surface without any physically existing control and/or or display devices. By contrast, when the food processor is viewed with the wearable image generating device, information within the viewing field of the user appear on the housing surface, evoking the impression that an active display is located there. If the projection surface for displaying the virtual information is locally allocated to the corresponding devices of the food processor, for example the preparation vessel or mixer, the partial area of the food processor in which an active display is usually located can instead be used for displaying a time of day or the like in a large format, which enables an especially large-format depiction, and hence good legibility. Because the image generating device replaces a classic, active display and potentially also a rotary actuator or the like, the housing of the food processor can be closed in design, making it more robust than a housing that exhibits recesses for control and/or display devices. As a rule, the closed housing surface is free of rough surfaces, and thus easier to clean, since no dirt can accumulate in grooves of the display frame or behind control devices. The presence of dirt or the like on the housing does not prevent the display of information, since the projected information is superposed onto the corresponding dirt when using the image generating device. In addition, the display and food processor housing need no longer be joined while manufacturing the food processor, thereby simplifying the production process in this regard.

In addition, it is proposed that the operating parameter for the food processor and/or preparation parameter for the preparation item be determined by a sensor of the food processor, and transmitted to the image generating device. As a consequence, there is a communication link between the image generating device and a sensor of the food processor, which detects the operating parameter or preparation parameter, and transmits it to a processor of the image generating device. The processor evaluates the sensor signals by comparing the latter with corresponding reference signals, and derives control commands for correspondingly actuating the light source or several light sources, for example from a table stored in a data memory of the image generating device. The processor thereupon controls the light source of the image generating device in such a way as to emit a light signal corresponding to the information. The sensor of the food processor can be a tachometer, a temperature sensor, a weighing device or the like.

It is proposed that the operating parameter for the food processor be a speed and/or a turning direction of a mixer, a temperature of a heating device and/or a time. In addition, it is proposed that the preparation parameter for the preparation item be a temperature and/or a weight of the preparation item and/or a preparation step in a recipe for preparing the preparation item. The term "operating parameter" here encompasses all parameters for the food processor relating to the operation of a technical installation of a food processor, for example the operation of the mixer, heating device or the like. For example, the mixer can operate at a specific speed and in a specific turning direction. In addition, the heating device, for example which is allocated to the preparation vessel, can be heated to a specific temperature. In addition, the food processor can also exhibit a clock, which outputs a time as an operating parameter. This time can indicate a timespan until the start of an ensuing preparation step or until the end of a preparation step currently being performed. The preparation parameters for the preparation item refer to those parameters that relate to a characteristic of the preparation item. For example, this can be the actual temperature of the preparation item within the preparation vessel, a weight of the preparation item or the like. Further understood by the latter is a preparation step in a recipe that serves to prepare the preparation item. For example, such a preparation step can contain an instruction to the user of the food processor to introduce a specific quantity of a preparation item into the preparation vessel. Taken together, this displayed information serves to instruct the user about the current operation of the food processor or about the current state of the preparation item, or to prompt the user to become active in a preparation step for the food processor.

It is further proposed that the image generating device project information onto a projection surface of the food processor exhibiting a touch sensor or onto a transparent surface worn in front of the eye that exhibits a touch sensor, and hence lies within the viewing field, and that the user control the food processor by touching the projection surface. In this embodiment, the projection surface serves not only to display information to the user, but rather is also used as an input panel for transmitting a command from the user to the food processor. By means of the projection surface, the user transmits information relating to an operating parameter for the food processor and/or to a preparation parameter for the preparation item to the food processor, in particular to an evaluation and control device of the food processor. As a consequence, the projection surface replaces the control devices required in conventional food processors, for example buttons, knobs or the like. The projection surface has allocated to it a touch sensor, which recognizes when a user touches the projection surface, and thereupon triggers a specific reaction. For example, the touch sensor can be a capacitive touch sensor. The image generating device is used to project virtual images of corresponding control devices onto the housing of the food processor, so that the user recognizes what partial area of the housing he or she must touch to initiate a specific input. The projected images can simulate the appearance of conventional buttons, knobs or the like, so that the user immediately recognizes their function. The functions of the partial areas of the housing can here also be dynamically changed; for example, one and the same partial area can be used during a first preparation step of the recipe to set a cooking time, and during a second preparation step to change the turning direction of the mixer of the food processor. As a consequence, the projection surface simultaneously performs two functions of a communication device. On the one hand, information is transmitted to the user to instruct him or her about a current operating parameter for the food processor and/or a current preparation parameter for the preparation item; on the other hand, the user is provided with an input device, which he or she can use to transmit information to the food processor, for example so as to actively intervene in the preparation of a preparation item.

In addition, the invention proposes that the image generating device project the information as a function of a viewing angle of the user relative to the food processor. The location of the projected information on the food processor is here advantageously adjusted to the viewing angle of the user. For example, if the user is looking at the housing of the food processor from the side, the information will be displayed on the side of the corresponding partial area of the food machine, while the information will be displayed on the food processor, if necessary in the open mixing vessel or the like, given a view from above. In the event that the displayed information involves a preparation step for a recipe, the information can also be displayed in the sense of a so-called "guided cooking" next to the food processor. For example, information about the weight of an ingredient currently filled into the preparation vessel can here in particular be incorporated into a virtual recipe, so that the user is automatically provided with information as to the extent to which the desired weight goal has been reached. In order to incorporate the information into the viewing field of the user by means of the image generating device as a function of viewing angle so that it is locally correlated with a specific device of the food processor, the location and orientation of the food processor in the viewing field of the user or image generating device must be determined. To this end, the positions of marking elements arranged on the housing of the food processor can advantageously be determined. These marking elements can be spaced apart from each other by a specific distance on the housing, as well as exhibit a defined height and width. A detection device, for example a camera of the image generating device, evaluates these marking elements with respect to their geometry and arrangement on the food processor, and from that determines the viewing angle of the user or image generating device on the projection surface of the food processor. As a result of the prescribed geometry and position of the marking elements and corresponding 2D image features, the position of the marking elements, and hence of the entire food processor, can be determined based upon algorithms that establish correspondences between 2D feature positions of the marking elements and 3D model points of the food processor.

Proposed apart from the method according to the invention described above is an electrically driven food processor, which exhibits a preparation vessel, a mixer and/or heating element allocated to the preparation vessel, and a communication device for communicating with a user of the food processor, in particular for transmitting information relating to an operating parameter for the food processor and/or a preparation parameter for a preparation item, wherein the communication device exhibits a projection surface with a touch sensor for displaying information, and wherein the communication device has allocated to it at least one marking element for determining a spatial orientation of the food processor, in particular relative to an external image generating device. The proposed food processor thus exhibits a communication device, which on the one hand exhibits a projection surface with touch sensors, and on the other hand marking elements that define a position relative to the projection surface. The marking elements can be used by an image generating device to determine a current viewing angle of a user on the food processor, and as a result to vary how the information is displayed on the projection surface of the food processor. For example, the information is arranged on different partial areas of the machine housing depending on the viewing angle of the user, or changed in a natural way corresponding to the viewing angle, for example distorted.

In addition, it is provided that the communication device exhibit several spaced apart marking elements, which each exhibit a plurality of two- or three-dimensional partial marking elements situated one next to the other. The marking elements are spaced apart from each other, and occupy a surface with a defined height and a defined width. The marking element here advantageously consists of a grid of partial marking elements situated uniformly one next to the other. For example, these partial marking elements can be actively luminous points, for example in green, whose size varies depending on the position within the grid. In a preferred direction of the marking elements, for example, the partial marking elements can become smaller over the direction. The marking elements are recognized from their color feature by means of a detection device of the image generating device, for example a camera, so that their position and orientation can be reliably determined.

Also provided according to the invention is a system comprised of a food processor, in particular a food processor proposed above, and a wearable image generating device formed separately from the latter, in particular a projector allocated to an eye of the user of the food processor, wherein the food processor exhibits a preparation vessel, a mixer and/or heating element allocated to the preparation vessel, and a communication device for communicating with a user of the food processor and/or with the image generating device, wherein the communication device exhibits a projection surface for displaying information that relates to an operating parameter for the food processor and/or a preparation parameter for a preparation item, and is projected by the image generating device. The advantages described above in relation to the method are obtained with respect to this proposed system comprised of a food processor and image generating device.

Finally proposed with regard to the system according to the invention as well is that the food processor exhibit at least one marking element for spatially orienting the image generating device relative to the food processor, in particular relative to the projection surface, wherein the image generating device exhibits a detection device for detecting the marking element, an evaluation and control device for determining the orientation of the image generating device relative to the marking element, and a light source for optically emitting the information. The image generating device can be allocated to an eye of a user of the food processor like a kind of eyeglass frame, so that the image generating device is located in the viewing field of the eye. The image generating device preferably exhibits a processor for determining the orientation of the image generating device relative to the food processor. Depending on the result, the evaluation and control device controls the light source so as to project the information to be projected onto the projection surface of the food processor or into the eye of the user according to this orientation. If necessary, the light emitted from the light source and containing the information can be deflected and/or focused by means of optical elements. For example, lenses, prisms, mirror or the like are here conceivable.

BRIEF DESCRIPTION OF THE DRAWINGS

The invention will be explained in more detail below based on exemplary embodiments. In the drawings:

FIG. 1 is a perspective view of a food processor according to the invention,

FIG. 2 is a system comprised of a food processor and an image generating device, FIG. 3 is the image generating device while detecting marking elements of the food processor, FIG. 4 is the food processor with information projected onto projection surfaces, FIG. 5 is a food processor with information projected onto projection surfaces, FIG. 6 is a food processor with information projected onto projection surfaces, and FIG. 7 is the food processor with projection surfaces exhibiting touch sensors.

DETAILED DESCRIPTION OF THE EMBODIMENTS

FIG. 1 shows a food processor 1, which is here designed as a cooking and mixing device operated by electric motor. In the usual manner, the food processor 1 exhibits a housing, into which a preparation vessel 7 can be placed. The preparation vessel 7 has allocated to it a mixer 6, for example which is designed as a blade assembly, and projects into the preparation vessel 7. In addition, a heating device can be allocated to the preparation device 7. In particular, the latter is arranged in the floor of the preparation vessel 7. The housing of the food processor 1 further exhibits projection surfaces 5, which are essentially flat in design, and exhibit no gaps, scoring or the like. The projection surfaces 5 are advantageously comprised of a visible light-reflecting material, making it suitable for displaying information projected thereon.

FIG. 2 shows the food processor 1 in an activated state. One of the projection surfaces 5 here exhibits two marking elements 8, which are spaced apart from each other by distance d. Each of the two marking elements 8 exhibits a plurality of partial marking elements 9, which are situated next to each other and one above the other in the form of an array. The partial marking elements 9 form lines and columns, wherein partial marking elements 9 arranged in the same line are identical in size, and partial marking elements 9 arranged in a column increase in size from the first line to the lowermost line. The marking elements 8 are here designed as light-emitting diodes that emit green light.

The depicted image generating device 3 is designed like a pair of glasses, the frame of which accommodates a detection device 10 (here a camera), a light source 4 and an evaluation and control device 11 (processor). The light source 4 advantageously has allocated to it an optical device (not shown), which focuses and/or deflects the light emitted by the light source 4, so that the emitted light is projected either into the eye of a user of the food processor 1 or onto a projection surface 5 of the food processor 1. The detection device 10 further exhibits a detection region, which essentially corresponds to the visual field of the user, and comprises the food processor 1, in particular also the marking elements 8.

FIG. 3 shows the image generating device 3 and marking elements 8 in detail. The two marking elements 8 each exhibit the same height h and width b, and are situated at a distance d from each other. The arrangement of the partial marking elements 9 of each marking element 8 is established as explained above in reference to FIG. 2.

FIGS. 4 to 7 present different views of information 2 on the projection surfaces 5 of the food processor 1.

With respect to FIG. 4, the information 2 projected onto the projection surfaces 5 encompasses a timespan of a preparation step for the food processor 1, a current time of day, a turning direction and speed of rotation of the mixer 6 of the food processor 1, as well as a current temperature of the heating device of the food processor 1.

On FIG. 5, the information 2 encompasses a preparation step in a recipe for preparing the preparation item, along with a weight of a preparation item contained in the preparation vessel 7 of the food processor 1.

FIG. 6 presents a top view of the food processor 1, wherein the preparation vessel 7 is closed with a cover. A projection surface 5 formed on the cover exhibits information 2 about the current speed of rotation and turning direction of the mixer 6, as well as a current temperature of the heating device of the preparation vessel 7.

FIG. 7 presents a perspective view of a food processor 1, wherein two projection surfaces 5 exhibit touch sensors, onto which information 2 is projected in a locally corresponding manner. The information 2 here encompasses virtual images of control devices for changing a preparation time or speed of rotation. In addition, the projected information 2 encompasses a timespan, a time of day, a turning direction of the mixer 6, along with a current temperature of a heating device allocated to the preparation vessel 7.

In detail, the invention functions in such a way that the user of the food processor 1 places the image generating device 3 in front of his or her eyes like a kind of eyeglass frame. The user activates both the image generating device 3 and food processor with conventional on-off switches. Turning on the food processor 1 causes the two marking elements 8 to appear on the housing of the food processor 1, which are allocated to one of the projection surfaces 5. The marking elements 8 are designed as LED's, and here emit green light.

The user of the food processor 1 looks at the food processor 1, so that the latter is situated in the visual field of his or her eyes. As a result, the food processor 1 is simultaneously also in the detection region of the detection device 10, which records an image of the food processor 1 based on the actual viewing angle of the user relative to the food processor 1. This image is transmitted by the detection device 10 to the evaluation and control device 11, which evaluates the image with respect to the position and orientation of the marking elements 8 on the housing of the food processor 1. Based on the size and distances of the partial marking elements 9 of the marking elements 8 arranged one next to the other, the evaluation and control device 11 can recognize the distance between the image generating device 3 and food processor 1, as well as the viewing angle of the image generating device relative to the food processor 1. To this end, the detected marking elements 8 are compared with reference data stored in the evaluation and control device 11 or an allocated memory.

In addition, sensors of the food processor 1 continuously measure current operating parameters for the food processor 1 and preparation parameters for the preparation item located in the preparation vessel 7. For example, the operating parameters are here a turning direction and speed of rotation of the mixer 6, a current temperature of the heating device and an indicated time until a current preparation step concludes. In addition, the information 2 projected onto the projection surfaces 5 also encompasses preparation parameters for the preparation item, here specifically a current weight of an ingredient to be filled into the preparation vessel 7 and a next preparation step in a recipe.

The sensors of the food processor 1 transmit the measured operating parameters or preparation parameters to the evaluation and control device 11 of the image generating device 3. This is accomplished here by a radio connection that exists between the food processor 1 and the evaluation and control device 11.

The evaluation and control device 11 of the image generating device 3 thereupon determines control commands stored in the data memory of the image generating device 3 for corresponding operating parameters or preparation parameters, with which the light source 4 can be controlled in such a way as to emit corresponding information 2 and project it onto the projection surfaces 5 of the food processor 1. Considered at the same time is the viewing angle at which the food processor 1 or projection surfaces 5 is situated relative to the image generating device 3, and hence simultaneously also relative to the light source 4. This also involves distinguishing the view, for example between a current side view or a top view of the food processor 1.

The evaluation and control device 11 of the image generating device 3 correspondingly determines the current orientation of the food processor 1 and the projection surfaces 5 of the food processor 1 that are here available and can be used for displaying the information 2. The respective information 2 is here projected onto the projection surface 5 of the food processor that corresponds with the operating parameter or preparation parameter. According to FIG. 4, for example, the speed of rotation and turning direction of the mixer are displayed on a projection surface 5 located close to the mixer 6 of the preparation vessel 7. The same holds true for the current temperature of the heating device of the preparation vessel 7. With respect to the preparation step in a recipe shown on FIG. 5, the information 2 is displayed next to the food processor 1, with an arrow pointing in the direction of the filler hole of the preparation vessel 7. This tells the user of the food processor 1 that an ingredient must be put into the preparation vessel 7. At the same time, a current weight of the ingredient to be added is displayed with the preparation step.

In the depicted exemplary embodiment, the information 2 is not actually projected onto the projection surfaces 5, but rather into the eye of the user, causing the information 2 to be superimposed onto his or her viewing field, giving the user the impression that the information 2 is actually being displayed on the projection surfaces 5. This results in the sensory impression similar to a conventional active display. Alternatively, however, the information 2 could also be projected onto the projection surfaces 5.

In addition, the projected information 2 encompasses virtual images of control devices for changing the operating parameters "speed of rotation" and "preparation time". These images simulate conventional pushbuttons. The projection surfaces 5 in question here exhibit touch sensors, which are here integrated into the material of the housing of the food processor 1, for example. Touching the projection surfaces 5 activates the touch sensors and changes the allocated operating parameter, for example increases or decreases the speed of rotation or raises or lowers the preparation time. Activating the projection surfaces 5 simultaneously also updates the information 2, i.e., the displayed speed of rotation or preparation time.

LIST OF REFERENCES

1 Food processor
2 Information
3 Image generating device
4 Light source
5 Projection surface
6 Mixer
7 Preparation vessel
8 Marking element
9 Partial marking element
10 Detection device
11 Evaluation and control device
b Width
d Distance
h Height

What is claimed is:

1. An electrically driven food processor comprising:
a preparation vessel,
a mixer and/or heating element allocated to the preparation vessel, and a communication device configured for transmitting information about an operating parameter for the food processor and/or a preparation parameter for a preparation item to a user of the food processor,
wherein the communication device exhibits a projection surface with a touch sensor for displaying information, and wherein the communication device has at least one marking element configured for determining a spatial orientation of the food processor relative to an external image generating device, the marking element exhibiting a grid of a plurality of two- or three-dimensional partial marking elements situated uniformly one next to the other, wherein the partial marking elements are actively luminous points and become smaller in a preferred direction of the marking element.

2. The food processor according to claim 1, wherein the communication device exhibits several marking elements spaced apart by a distance.

3. The food processor according to claim 1, wherein the communication device comprises a projector allocated to an eye of the user of the food processor.

4. A system comprised of a food processor and a wearable image generating device that is designed in the form of a pair of glasses and is formed separately from the food processor, wherein the wearable image generating device comprises a projector for projecting information into a visual field of the user, and wherein the food processor comprises a preparation vessel, a mixer and/or heating element allocated to the preparation vessel, and a communication device for communicating with a user of the food processor and/or with the image generating device, wherein the communication device exhibits a projection surface for displaying information that relates to an operating parameter for the food processor and/or a preparation parameter for a preparation item, and is projected by the image generating device.

5. The system according to claim 4, wherein the food processor has at least one marking element for spatially orienting the image generating device relative to the projection surface, wherein the image generating device has a detection device for detecting the marking element, an evaluation and control device for determining the orientation of the image generating device relative to the marking element, and a light source for optically emitting the information.

\* \* \* \* \*